United States Patent Office 2,699,862
Patented Jan. 18, 1955

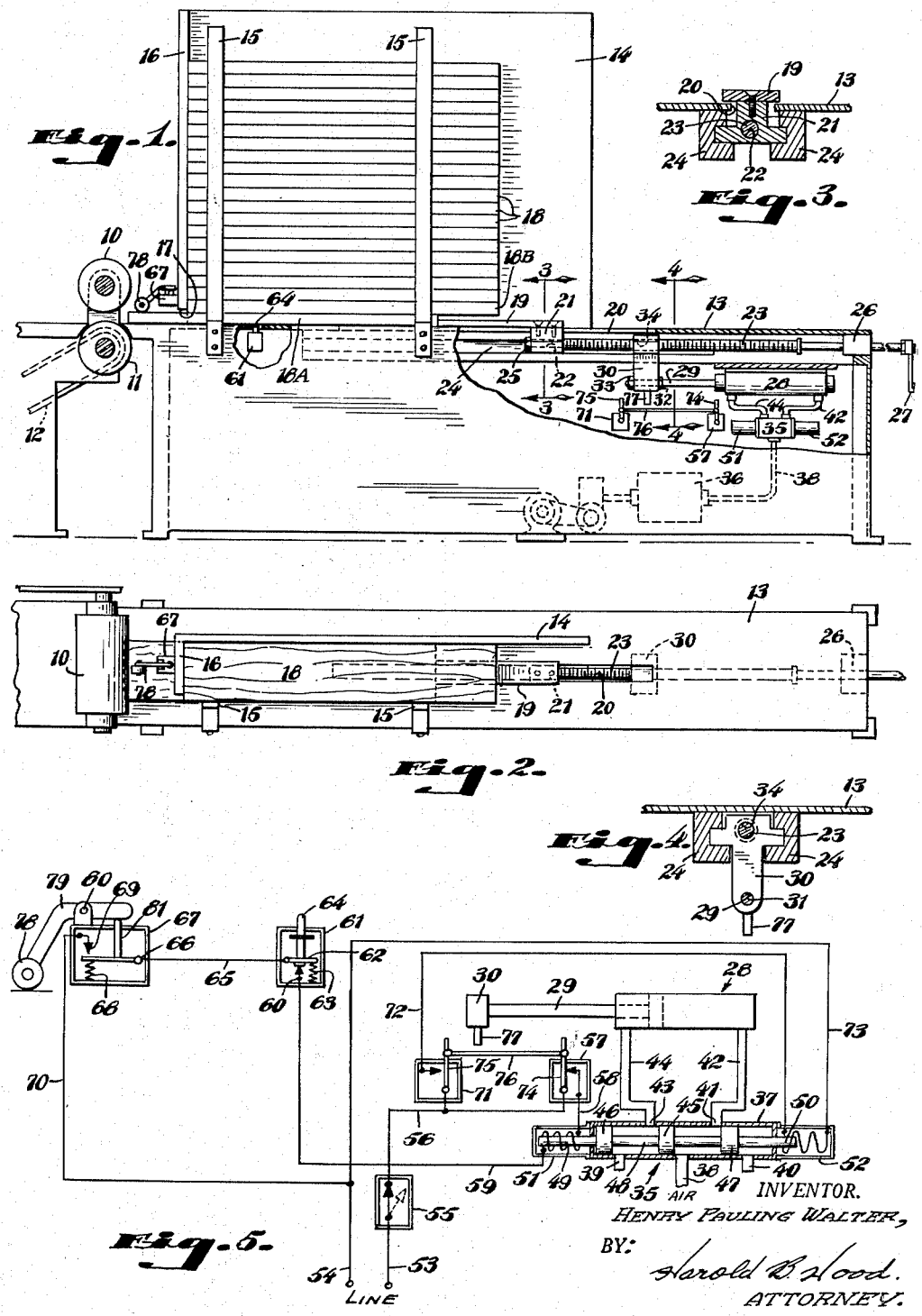

2,699,862

ARTICLE UNSTACKING AND FEED MECHANISM

Henry Pauling Walter, Wabash, Ind., assignor to B. Walter & Company, Inc., Wabash, Ind., a corporation of Indiana Application May 3, 1951, Serial No. 224,369

2 Claims. (Cl. 198—221)

The present invention relates to a feed mechanism, and more particularly to a device constructed and designed to feed stacked articles successively to an article-advancing means of any kind.

The primary object of the invention is to provide automatic mechanism, for association with article-advancing means, whereby articles, stacked in superposed relation in a magazine, will be individually and successively fed to such advancing means, the bottommost article in the magazine being acted upon by the mechanism, and the mechanism including article-actuated means dominating the operation of such mechanism to assure proper cycling thereof. A further object of the invention is to provide such mechanism adaptable for use with articles of various sizes. A further object is to provide, in such a mechanism, means preventing initiation of an article-moving cycle except when an article is in proper position to be moved by the mechanism. A further object of the invention is to provide, in such a mechanism, means preventing initiation of an article-moving cycle until the next preceding article has been moved, by external means, out of possible interfering relation with an article to be moved by such mechanism.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation, more or less diagrammatic, of an embodiment of the present invention, parts being broken away for clarity of illustration;

Fig. 2 is a plan view thereof;

Fig. 3 is an enlarged fragmentary section taken substantially on the line 3, 3 of Fig. 1;

Fig. 4 is an enlarged fragmentary section taken substantially on the line 4, 4 of Fig. 1; and Fig. 5 is a wiring diagram including a diagrammatic illustration of the operating parts of a fluid motor and controls therefor.

Referring more particularly to the drawings, it will be seen that I have illustrated an article-advancing means of conventional type, comprising mating rolls 10 and 11, at least one of which is adapted to be driven, as, for instance, by a belt 12. The term "article-advancing means" is used in the present specification, and in the claims appended hereto, to include any kind of device, including a work-performing machine, a conveyor of any sort, or any other form of means which, when an article is delivered thereto, will transport that article to some different location. The present invention is directed to a device whose function is to deliver articles, individually and successively, from a stock pile thereof to any such advancing means.

The machine of the present invention finds its primary utility in an environment in which it is called upon to deliver boards, of uniform size, from a magazine in which such boards are stacked in superposed relation, to an advancing means which may constitute a part of, for instance, a gluing machine such as a core-forming machine used in the production of plyboard. The invention has been illustrated, and will be described, in that environment; but it is to be understood that the invention is by no means limited to that particular environment, but may find utility in many other situations in which articles are to be successively and individually fed from a stock pile to some other machine.

In the illustrated embodiment of the invention, a table 13 supports a magazine comprising upstanding walls or abutments 14 and 15 with a barrier 16 at the delivery end of such magazine, the lower end 17 of said barrier being spaced above the table 13 by a dimension exceeding the vertical dimension of any one of the articles 18 stacked in the magazine, but less than twice that thickness. Thus, when a supply of articles 18 is stacked in superposed relation in the magazine, the bottommost article 18A, which rests directly upon the table 13, is free to move through the delivery end of the magazine, beneath the lower end 17 of the barrier 16; but all of the articles 18 superposed upon the article 18A are retained, by the barrier 16, against such movement.

A pusher 19 is supported and guided, by any suitable means, for reciprocation in the line of movement of the article 18A, and at a level to engage said bottommost article of the stack supported in the magazine. In the particular embodiment of the invention illustrated, the pusher 19 rests upon the surface of the table 13, and said table is formed with a longitudinal slot 20 through which projects a bracket 21 fixedly secured to the pusher 19. At or near its lower end, the bracket 21 is formed with an opening 22 therethrough, in which is received and supported an end of a screw shaft 23. The opening 22 is not threaded, and the screw shaft 23 is free to rotate within said opening; but said shaft is held against axial movement relative to the bracket 21 by any suitable means such as, for instance, a nut 25 on the projecting end of the screw shaft and bearing against one end of the bracket 21, and a shoulder on the screw shaft bearing against the other end of said bracket. The bracket 21 is preferably slidably mounted in a trackway defined by rails 24, 24 supported upon and depending from the table 13, as is most clearly illustrated in Fig. 3. Said trackway, of course, parallels the slot 20 and the path of movement of the pusher 19.

At the end of the table remote from the rolls 10 and 11, there is dependently supported a bearing means 26 in which the rear end of the screw shaft 23 is journalled for free rotation and reciprocation relative to said bearing means; and said shaft may extend a substantial distance beyond said bearing means, to the right as viewed in Fig. 1, in order to provide for substantial axial movement of said shaft relative to said bearing means. A crank 27, wheel, or any other desired means through which the shaft 23 may be rotated, is carried at the rear extremity of said shaft.

Suitably supported beneath the table 13 is a motor, indicated generally by the reference numeral 28, and having a reciprocatory power delivery element 29. A bracket 30 is formed with an opening 31 sleeved on said element 29 and held against axial movement relative to the element 29 by suitable means such as the nuts 32 and 33. At its upper end, the bracket 30 may be formed for slidable engagement and guidance in the rails 24, 24, and is formed with an internally threaded opening 34 coaxial with the opening 22 in the bracket 21 and threadedly engaging the screw shaft 23. The path of reciprocation of the power delivery element 29 is, of course, parallel with the axis of the screw shaft 23; and it will be immediately apparent that rotation of the shaft 23, in one direction or the other, will adjust the position of the pusher 19 relative to the power delivery element 29, in one direction or the other by producing axial movement of the shaft 23 relative to the bracket 30 which is fixed to the element 29.

In the illustrated embodiment of the invention, the motor 28 is a double-acting, reciprocating fluid motor whose action is dominated by valve mechanism indicated generally by the reference numeral 35. Fluid under pressure, which may be air retained in a pressure tank 36, is supplied to the cylindrical housing 37 of the valve mechanism 35 through a conduit 38, and said housing is provided, adjacent its opposite ends, with exhaust ports 39 and 40 which, if the motive fluid is to be air, may open to the atmosphere. Of course, if a liquid motive fluid is used, conduit means may be provided connecting the exhaust ports 39 and 40 with a suitable reservoir.

A delivery port 41 in the valve housing 37 is connected by a conduit 42 with one end of the motor cylinder, while a delivery port 43 is connected by a conduit 44 with the opposite end of said motor cylinder. Within the valve housing 37 there is mounted a valve member comprising an intermediate head 45 and oppositely spaced terminal heads 46 and 47, said heads being joined by a stem 48 which has opposite projections 49 and 50 acting, respectively, as armatures for solenoids 51 and 52. It will be clear that, with the valve member in the position illustrated in Fig. 5, motive fluid will be supplied through the conduit 38, port 41, and conduit 42, to the right-hand end of the motor cylinder to drive the power delivery element 29 toward the left, while fluid is exhausted from the left-hand end of the motor cylinder through the conduit 44, port 43 and port 39. When, however, the valve member is shifted to the right-hand end of its stroke, the head 45 will intervene between the ports 38 and 41, the head 47 will open communication between the ports 41 and 40, and the head 46 will intervene between the ports 43 and 39, so that motive fluid will be supplied to the left-hand end of the motor cylinder through the ports 38 and 43 and the conduit 44, while fluid will be exhausted from the right-hand end of the cylinder through conduit 42 and ports 41 and 40, whereby the member 29 will be shifted to the right-hand end of its stroke. The valve member is pneumatically balanced so that it will remain in any position to which it is moved, until an external force is applied thereto to shift it to a new position. Obviously, energization of the solenoid 52 will shift the valve member from its illustrated position to the right-hand end of its stroke, while energization of the solenoid 51 will return the valve member to its illustrated position.

A source of electric current is indicated, in Fig. 5, by the line wires 53 and 54. A service switch 55 is shown, interposed between the wire 53 and a wire 56 which is connected to one terminal of a switch 57, the opposite terminal of which is connected by wire 58 to the winding of solenoid 51. The wire 59 leads from said winding to one terminal 60 of a switch 61 which, as is clearly illustrated, is positioned beneath the table 13 near the barrier 16, but within the magazine, in registry with the stack of articles 18. The other terminal 62 of said switch 61 is normally held out of electrical contact with the terminal 60 by a spring 63, but the switch 61 includes an actuator 64 which, as shown in Fig. 1, projects through the table 13 to be engaged and depressed to switch-closing position by an article 18A resting upon the table 13 within the magazine.

A wire 65 leads from the switch terminal 62 to one terminal 66 of a further switch 67, said terminal being normally held in electrical contact with the other terminal 69 of said switch by a spring 68. A wire 70 leads from the switch terminal 69 back to the line wire 54.

Connected in parallel with the switch 57 is a switch 71 from which a wire 72 leads to the winding of the solenoid 52, a wire 73 leading directly from said winding back to the line wire 54.

The switch 57 includes a movable arm 74, and the switch 71 includes a movable arm 75, said arms being connected, by a link 76, to move together, and the arrangement being such that, when one of said switches is closed, the other switch will be open. The ends of the arms 74 and 75 project into the path of a finger 77 moving with the power delivery element 29 of the motor 28 and, in the illustrated embodiment of the invention, carried upon the bracket 30. The arrangement is such that, as the power delivery element 29 attains the end of its article-moving stroke, it will strike the arm 75 to open the switch 57 and close the switch 71; and, as it nears the end of its retractile stroke, it will strike the arm 74 to close the switch 57 and open the switch 71.

Associated with the switch 67 is an actuator lever 79 carrying, at one end, a roller 78 normally disposed in the path of an article moving from the magazine toward the advancing rolls 10 and 11. As is indicated in Fig. 1, the article 18A will strike and lift said roller before its engagement by the rolls 10 and 11, to swing the lever 79 in a clockwise direction about its pivotal mounting 80 upon the housing of the switch 67. The opposite arm of the lever 79 engages a plunger 81 arranged, upon such movement of the lever 79, to open the switch 67 against the tendency of the spring 68.

The operation of the machine disclosed herein is as follows. Assuming a superposed stack of articles 18 to be arranged in the magazine, with the bottommost article 18A resting upon the table 13, and assuming the rolls 10 and 11 to be in operation, it will be seen that the switch 61 will be closed, by depression of the actuator 64 which is engaged by the article 18A, and that the switch 67 will be closed because the roller 78 is in its lowermost position. The motor power-delivery element 29 will be assumed to be in its retracted position, so that the plunger 19 is out of contact with the element 18A, and the switch 57 is closed. The position of the plunger 19 will, of course, be preselected to conform to the uniform length of the articles 18.

If, now, the switch 55 is closed, the solenoid 51 will be energized through a circuit traced from the line wire 53 through switch 55, wire 56, switch 57, wire 58, winding of solenoid 51, wire 59, closed switch 61, wire 65, closed switch 67 and wire 70 to the line wire 54. The valve member of valve 35 will thereupon be moved to the position in which it is illustrated in Fig. 5, whereby fluid under pressure will be delivered to the right-hand end of the motor 28 to drive the power delivery element 29 toward the left. Thus the pusher 19 will be caused to engage the rear end of the article 18A and to force said article to move past the lower end 17 of the barrier 16. As the article 18A begins such movement, it will strike and lift the roller 78, as indicated in Fig. 1. The superposed articles 18 in the magazine will be retained by the barrier 16 against any movement with the article 18A.

As the roller 78 is lifted, the plunger 81 will be depressed to open the energizing circuit for the solenoid 51 at the switch 67; but the valve 35 will be unaffected, since its valve member is pneumatically balanced.

The element 29 and the pusher 19 will thus continue to move the article 18A until the forward end of that article enters between the rolls 10 and 11, which will seize the article 18A and carry it to a desired point. As the article is so seized by the rolls 10 and 11, the power delivery element 29 reaches the end of its article-shifting stroke, and the finger 77 will engage the arm 75 to close the switch 71 and open the switch 57.

Closure of the switch 71 establishes an energizing circuit for the winding of the solenoid 52, to be traced from the line wire 53 through switch 55, wire 56, closed switch 71, wire 72, winding of solenoid 52, and wire 73 back to line wire 54. The armature 50 of the solenoid 52 will thus be shifted to the right, carrying with it the valve member, whereby said valve member will be moved to the right-hand end of its stroke to cause fluid under pressure to be delivered to the left-hand end of the motor cylinder 28 and to provide for exhaust of fluid from the right-hand end thereof. Thus, the power delivery member 29 will be retracted to the right-hand limit of its stroke, and as it approaches that limit, the finger 77 will strike the arm 74 to close the switch 57 and open the switch 71.

Closure of the switch 57, however, will not establish an energizing circuit for the solenoid 51, because the roller 78 is still riding the article 18A, to hold the plunger 81 depressed, whereby the switch 67 is held open.

As the trailing end of the article 18A passes the actuator 64 of the switch 61, that actuator will be moved upwardly by the spring 63 to open the switch 61.

The article 18B immediately superposed upon the article 18A will, of course, be held in at least partly elevated position until the trailing end of the article 18A has cleared the forward end of the article 18B. Normally, the article 18B will then immediately drop onto the table 13, thus depressing the actuator 64 to close the switch 61. If, however, for any reason, the article 18B should fail to drop into a position in which it clears the lower end 17 of the barrier 16, the actuator 64 will not be depressed, and the switch 61 will remain open.

Even after the article 18B has dropped, in normal operation, the switch 67 will still be held open until the trailing end of the article 18A has passed from beneath the roller 78. If, at that moment, the actuator 64 is in depressed condition, the energizing circuit for the solenoid 51 will be established immediately when the roller 78 drops off the trailing end of the article 18A; and the motor 28 will promptly be energized to drive the pusher 19 forward to feed the article 18B, in the same manner, to the rolls 10 and 11.

I prefer to design the motor 28 in such a way that its speed of operation will substantially exceed the peripheral speed of the rolls 10 and 11 so that, although the article 18B will not be started toward the rolls 10 and 11 until the trailing end of the article 18A is almost ready to leave those rolls, the article 18B will nevertheless be so rapidly forwarded that its leading end will substantially overtake the trailing end of the article 18A. In one commercial embodiment of the invention, for instance, the peripheral velocity of the rolls 10 and 11 is 1200 inches per minute, while the velocity of operation of the pusher 19 is 2000 inches per minute.

It will be apparent that, through manipulation of the screw shaft 23, the machine can be adapted for operation to feed articles of widely varying lengths. Of course, however, for any given adjustment effected through manipulation of the shaft 23, all of the articles 18 should be of equal length.

Adjustment for handling articles of varying thickness may be made by adjusting the vertical position of the barrier 16, in any conventional fashion; and adjustments for handling articles of varying widths may be made by modifying the distance between the abutment 14 and the abutment 15.

It will be apparent that the switch 57 is not essential to operation of the disclosed feed mechanism, except to insure the mechanism against possible excitation of the solenoid 51 before the plunger 19 has been fully retracted, since normal control of the energizing circuit for the solenoid 51 is effectively attained through the switches 61 and 67.

It will also be apparent that reasonably satisfactory control of the mechanism could be attained through the use of either of the switches 61 and 67, without the other, though I presently believe the arrangement of both of those switches in series in the energizing circuit for the solenoid 51 to be optimum.

The range of article lengths to which the machine may be adapted can be increased by selectively substituting for the pusher 19 other pushers of varying lengths.

I claim as my invention:

1. In a device of the class described, a pusher, means guiding said pusher for rectilinear reciprocation, a screw shaft mounted for rotation and reciprocation on an axis parallel with the line of movement of said pusher, means providing an operative connection between said pusher and said shaft and permitting free rotation of said shaft but preventing axial movement of said shaft relative to said pusher, a motor including a reciprocatory power-delivery element mounted for reciprocation upon a line parallel with the line of movement of said pusher, means axially fixed with respect to said power-delivery element and threadedly engaged with said screw shaft providing a driving connection between said power-delivery element and said screw shaft, and crank means for turning said screw shaft to adjust the position of said pusher longitudinally relative to said power-delivery element.

2. In a device of the class described, a table, a pusher guided on said table for rectilinear reciprocation relative thereto, a screw shaft, bearing means supported from said table and located beneath the plane of travel of said pusher, a screw-shaft having a section freely journalled in said bearing means, upon an axis parallel with the line of travel of said pusher, for rotation and reciprocation relative to said bearing means, a motor having a reciprocatory power-delivery element, said motor being located adjacent said screw shaft with its power-delivery element reciprocable upon an axis parallel with the axis of said shaft, said table being provided with a slot therethrough parallel with the line of movement of said pusher, bracket means fixed to said pusher and projecting through said slot, said bracket means providing a bearing coaxial with said screw shaft and embracing and supporting said shaft at a point remote from said first-named bearing means, said bracket means being retained against relative movement axially of said screw shaft, other bracket means axially fixed with respect to said power-delivery element and having an internally-threaded opening therethrough coaxial with said shaft and threadedly receiving said screw shaft in a region between said bearing means and said bearing, and means for turning said screw shaft to adjust the position of said pusher longitudinally relative to said power-delivery element.

References Cited in the file of this patent

UNITED STATES PATENTS

| | | |
|---|---|---|
| 1,239,819 | Peters | Sept. 11, 1917 |
| 1,674,319 | Cranston | June 19, 1928 |
| 1,865,831 | Cave | July 5, 1932 |
| 1,977,696 | Purdy | Oct. 23, 1934 |
| 1,985,765 | Cornock | Dec. 25, 1934 |
| 2,253,027 | Hall | Aug. 19, 1941 |
| 2,508,861 | Jessen | May 23, 1950 |